United States Patent [19]

Babjak

[11] Patent Number: 4,610,861
[45] Date of Patent: Sep. 9, 1986

[54] PROCESS FOR METAL RECOVERY BY SOLVENT EXTRACTION FROM CASO$_4$ CONTAINING SULFATE SOLUTIONS

[75] Inventor: Juraj Babjak, Mississauga, Canada

[73] Assignee: Inco Limited, Toronto, Canada

[21] Appl. No.: 767,096

[22] Filed: Aug. 19, 1985

[30] Foreign Application Priority Data

Sep. 17, 1984 [CA] Canada .................................... 463309

[51] Int. Cl.$^4$ .......................... B01D 11/00; C22B 1/00
[52] U.S. Cl. .................................... 423/157; 423/139;
423/658.5
[58] Field of Search ...................... 423/157, 139, 658.5

[56] References Cited

U.S. PATENT DOCUMENTS

| | | | |
|---|---|---|---|
| 3,055,754 | 9/1962 | Fletcher | 423/139 |
| 3,140,915 | 7/1964 | Axelrod et al. | 423/658.5 |
| 3,154,390 | 10/1964 | Goren | 423/139 |
| 3,387,944 | 6/1968 | Sherrington et al. | 423/139 |
| 4,320,099 | 3/1982 | Babjak | 423/139 |
| 4,353,883 | 10/1982 | Rickelton et al. | 423/139 |
| 4,551,314 | 11/1985 | Beckstead et al. | 423/658.5 |

Primary Examiner—John Doll
Assistant Examiner—Wayne A. Langel
Attorney, Agent, or Firm—Francis J. Mulligan, Jr.; Raymond J. Kenny

[57] ABSTRACT

A multistage countercurrent solvent extraction process for removing cobalt from an aqueous sulfate solutions containing saturation amounts of calcium using an organic soluble phosphinic acid as the extractant preferably characterized by control of pH in various stages of the process to minimize scaling of gypsum in the extraction equipment.

6 Claims, 3 Drawing Figures

PROCESS FOR METAL RECOVERY BY SOLVENT EXTRACTION FROM CASO$_4$ CONTAINING SULFATE SOLUTIONS

The present invention is concerned with a process for solvent extraction and, more particularly, with a process for solvent extraction using a cationic extractant with an aqueous sulfate phase containing calcium ion in solution in an amount near the saturation limits for calcium sulfate.

PRIOR ART AND PROBLEM

In the industrial practice of hydrometallurgy it is quite common to provide aqueous sulfate solutions of valuable metals, e.g., nickel, cobalt, copper, zinc etc. Aqueous sulfate solutions are advantageous vis-a-vis chloride and nitrate solutions in that especially in comparison to chloride solution, aqueous sulfate solutions are usually less troublesome from a corrosion standpoint.

It is also advantageous in industrial hydrometallurgical practice to employ lime or limestone as a base. The advantage is primarily economic. On an equivalent basis, calcium base is about one sixth the cost of a sodium base. Also, when lime or limestone is used as a base in sulfate solutions, the bulk of the calcium added precipitates as calcium sulfate dihydrate leaving the resultant solution saturated in calcium sulfate. Very often one encounters hydrometallurgical sulfate solutions containing about 0.5 to 0.7 g pl of calcium ion depending upon the temperature of the solution and the ionic strength of other constituents. For purposes of this specification and claims such solutions are considered to be saturated with respect to calcium sulfate. If more calcium ion is forced into such solutions saturated with calcium sulfate, a condition of supersaturation will exist conducive to rapid scale deposition on equipment even though on the average an aqueous sulfate process stream is at or below the calcium sulfate saturation level. The present invention is concerned with avoiding such a localized supersaturation condition.

The particular concern of this invention is in the treatment of aqueous sulfate solutions containing nickel and cobalt from which cobalt is to be recovered by solvent extraction. In order to prevent difficulty because of the presence of a saturation amount of calcium ion in solution, one might consider removal of the calcium ion from solution. However, the removal of calcium from sulfate solutions also containing cobalt and nickel is quite difficult and expensive. One way of removing calcium from Co-Ni solution would be by precipitation as $CaF_2$. However an excessive quantity of $F^-$ is required over the stoichiometric requirement in order to reduce the calcium concentration to a low level. This results in a fluoride-contaminated solution which, following the solvent extraction of cobalt, must be treated for fluoride removal.

It has been suggested that calcium coextraction can be avoided during the cobalt extraction by a pre-extraction of calcium with di(2-ethylhexyl) phosphoric acid (D2EHPA) at a low pH e.g., a pH of about 2 to 3. However, if zinc removal prior to the solvent extraction of cobalt is not required, this means that an extra solvent extraction circuit is required for the entire aqueous stream.

With respect to solvent extraction, it is known to selectively extract cobalt from aqueous sulfate solutions in the presence of nickel employing:

D2EHPA—di(2-ethylhexyl) phosphoric acid, supplied by e.g., Mobil Chemical Company, USA; or PC88A—2-ethylhexylester of 2-ethylhexyl phosphoric acid, supplied by Diahachi Chemical Company, Japan; or Cyanex ™ —272—di(2,4,4' trimethylpentyl) phosphinic acid, supplied by Cyanamid Canada Inc.

These reagents exhibit different Co/Ni and Co/Ca selectivities as indicated below:

| Reagent | Co $\beta_{Ni}$ | Co $\beta_{Ca}$ |
| --- | --- | --- |
| D2EHPA | 14 | ~1 |
| PC 88A | 280 | ~1 |
| Cyanex$^{TM}$ 272 | 7000 | ~10$^2$ |

The experimentation which has led to the present invention has been carried out exclusively with Cyanex ™ 272 reagent but it is believed that the present invention is applicable to the use of any solvent extractant which has a high selectivity both for cobalt versus nickel and for cobalt versus calcium. Reagents inclusive of Cyanex ™ 272 and similar materials which may have the characteristics of Cyanex ™ 272 are described in U.S. Pat. No. 4,353,883 as organic-soluble phosphinic acids or salts thereof which are generally represented by the following structure:

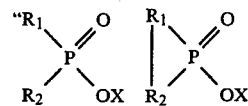

wherein $R_1$ and $R_2$ are individually substituted or unsubstituted alkyl cycloalkyl, alkowyalkyl, alkylcyclo alkyl, aryl, alkylaryl, aralkyl or cycloalkylaryl radicals and X is either hydrogen or salt-forming radical. Preferably, the organic-soluble phosphinic acid is decyclohexylphosphinic acid since it demonstrates significant selectivity and separates cobalt against calcium salts without leaving behind precipitates of calcium salts at the interface.

Typical organophosphinic acids within the purview of the invention include, but are not limited to: dimethyl; diethyl; di-n-propyl; diisopropyl; di-n-pentyl; di-n-hexyl; di-n-heptyl; di-octyl; di-n-hexadecyl; di-n-eicosyl; bis (2,4,4-trimethylpentyl); (2,4,4-trimethylpentyl) cyclohexyl; (2,4,4-trimethylpentyl) octyl; discyclopentyl; dicyclohexyl; dicyclooctyl; cyclohexyl, n-dodecyl; cyclooctyl ether; 2,4,6-triisopropyl-1; 3,5-dioxaphosphorinane, 5-hydroxy, 5-oxide;cyclohexyl, phenyl; cyclopentyl-p-tolyl; cyclooctyl-p-chlorophenyl; di-phenyl; di-o-tolyl; di-m-tolyl; di-p-toly.; bis (2,3-dimethylphenyl); bis (2,4-dimethylphenyl); bis (2,5-dimethylphenyl); bis (2,6-dimethylphenyl); bis (3,4-dimethylphenyl); bis (3,4-dimethylphenyl); bis (3,5-dimethylphenyl); di-(p-ethylphenyl); di-(p-octylphenyl); ethylphenyl; n-butylphenyl; n-octyl, phenyl; n-hexadecylphenyl; ethyl-o-tolyl; n-octyl-p-tolyl; bis (o-xhloeophwnyl); bis (bis(m-chlorophenyl); bis (m-chlorophenyl); methyl-o-clorophenyl; n-propyl-p-chlorophenyl; n-dodecyl-p-chlorophenyl; dibenzyl; methyl-naphthyl; idallyl; cyclohexyl, 1-hydroxycyclohexyl; bis (2-methyl-hydroxypentyl); benzyl, alpha-hydroxybenzyl; o-chlorobenzyl, alpha-hydroxy-o-chlorobenzyl; p-chlorobenzyl, alpha-hydroxy-p-chloro-benzyl; phenyl, alpha-methylbenzyl; cyclopentyl, 1-hydroxycyclophenyl; alpha-methylbenzyl, alpha-hydroxyl-alpha-methylbenzyl; 1-methylpentyl, 1-hydroxy-1-methylpentyl; n-octyl, alpha-hydroxylbenzyl; (1-hydroxy-1-methylethyl) isopropyl."

The problem which applicant has faced and solved is not the formation of precipitates of calcium salts at the organic-aqueous interface mentioned in the foregoing quotation from U.S. Pat. No. 4,353,883 but rather a distinct problem which exists in countercurrent extraction systems having a plurality of stages. In the solvent extraction examples set forth in U.S. Pat. No. 4,353,883 only a single stage extraction is disclosed. Accordingly, the preferred use of dicyclohexylphosphinic acid by the patentees is apparently based upon the avoidance of formation of calcium salts which have a low organic solubility and significant affinity for water and which may precipitate preferentially in the interphase region. Contrarywise, the present invention is concerned with the avoidance of loading of the sulfate-containing aqueous phase at one or more extraction stages with calcium ion so as to exceed the saturation limit of calcium sulfate.

DRAWING

PROBLEM SOLVED BY INVENTION

Figure 1:
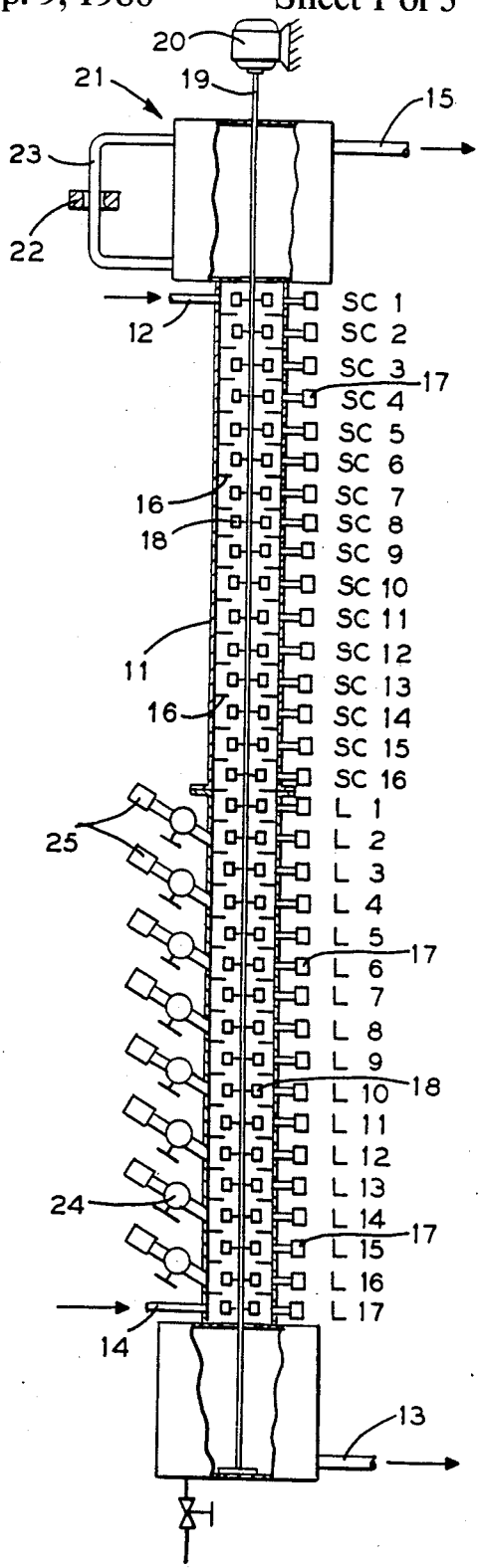
FIG. 1 is a cross-sectional view of a solvent extraction column.

Referring to FIG. 1 of the drawings, there is depicted in cross-section a vertically extending, cyclindrical, solvent extraction column 11 made of glass, metal, glass-lined metal or any suitable corrosion resistant material having an aqueous feed inlet 12 near the top and an aqueous raffinate exit 13 near the bottom. Column 11 is also fitted with an organic feed inlet 14 near the bottom and a loaded organic outlet 15 near the top. Column 11 is provided with a multiplicity of annular baffles 16 dividing the column into, as depicted, 33 compartments. The top 16 compartments labeled SC 1 through SC 16 (SC meaning "scrubbing") are of no concern to the present invention. Tubular sections 17 extending to the right of column 11 are schematic representations of sampling means whereby samples can be taken from each compartment. To complete the description of FIG. 1, the aqueous and organic phases in column 11 are agitated by means of thirty-three impellers 18, one to each compartment, mounted on shaft 19 which is driven by motor 20. Means are provided associated with top compartment 21 to control phase separation in top compartment 21 said means being depicted as a combination of sight glass 22 and photocell 23, photocell 23 being connected to means not depicted for controlling aqueous and organic flows. As depicted a plurality of means shown as a combination of ball valve 24 and Swageloc TM fitting 25 permit access to compartments L2, L4, L6, L8, L10, L12, L14, L16. These access means are employed to measure pH of the mixed aqueous an organic phases in column 11 and to add base to maintain the pH at a designed level in response to signals provided by the pH measuring means.

When operating column 11 at a fixed pH of 5, found to give excellent selective cobalt extraction from a cobalt/nickel aqueous sulfate solution, gypsum scaling difficulties were encountered. Actual process liquor from hydrometallurgical operations, analyzing (in g/l) 12.6 Ni, 14.4 Co, 0.764 Cu and 0.616 Ca (all as sulfates), was treated in modified column 11 using 20 v/o Cyanex TM 272 in Varsol TM DX 3641 as the organic phase extractant. Base was provided by an aqueous solution containing 100 g/l NaOH to maintain the desired pH of 5. The pH was controlled during the runs automatically using Radiometer TM titrators. Approximately 200 ml/min of the aqueous feed solution was fed into the upper part of the column and about 400 ml/min of the organic feed was fed into the last compartment of the loading section. The operating temperature was maintained at around 50° C. Three pH-control loops were used with six points of NaOH addition, arranged as follows:

|  | Loop 1 | Loop 2 | Loop 3 |
| --- | --- | --- | --- |
| pH-Electrode Comp't | L2 | L8 | L14 |
| NaOH Add'n Comp't | L2,L4 | L8,L10 | L14,L16 |

This arrangement was useful in order to minimize the number of titrators while achieving a high degree of cobalt extraction.

Figure 2:
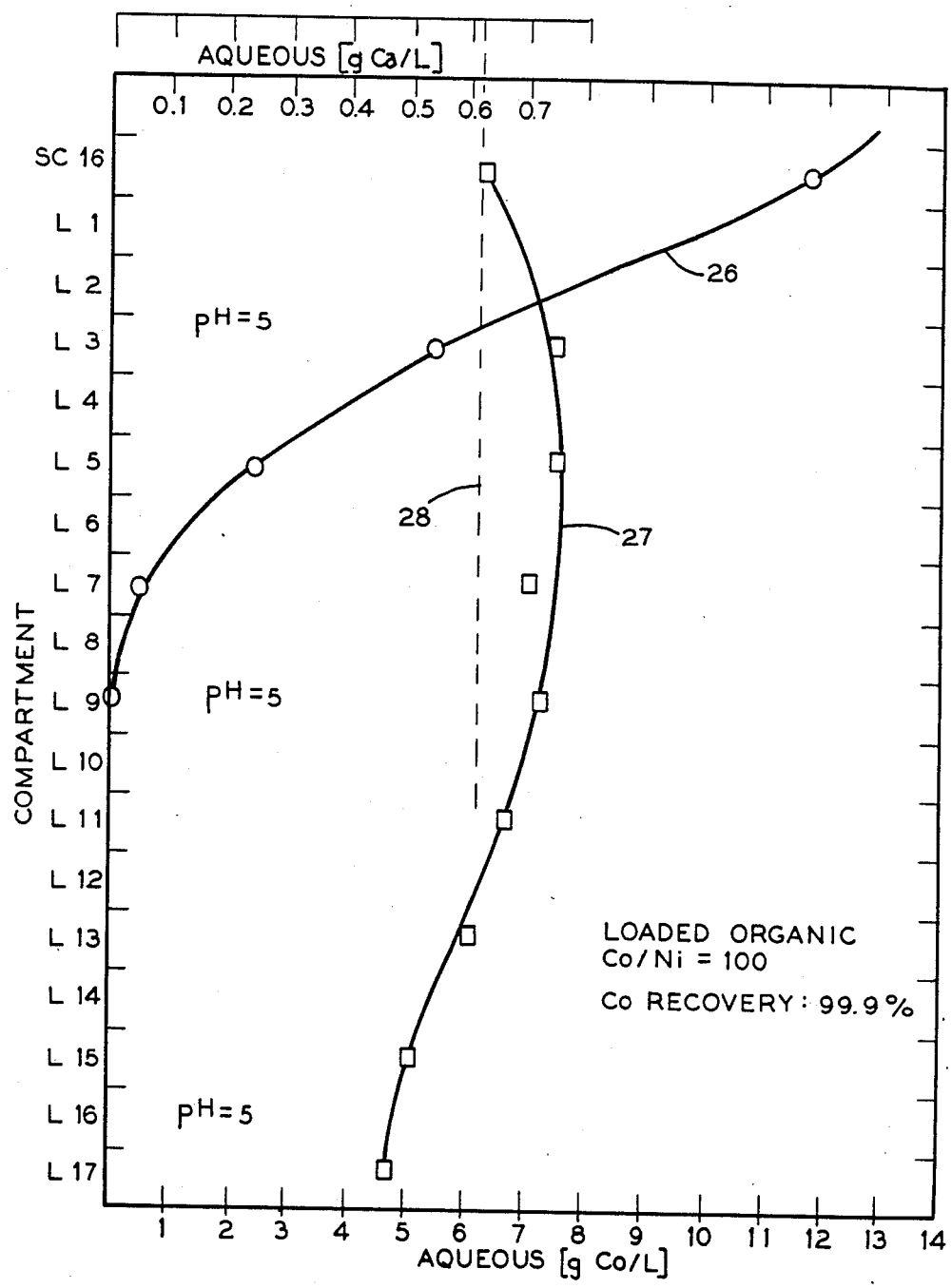
FIG. 2 is a graph interrelating aqueous cobalt and calcium contents with column positions when an extraction in the column is run at a fixed pH of 5.0.

The experimental results obtained when maintaining a constant pH of 5 are depicted in FIG. 2 of the drawing. FIG. 2 is a graph relating both aqueous cobalt content and aqueous calcium content (scaled on bottom and top absyssas respectfully) with the loading compartments of column 11 (scaled on the ordinate). Curve 26 of FIG. 2 show that ascending organic phase has extracted substantially all of the cobalt out of the aqueous phase at compartment L9 and the aqueous phase in compartments L10 through L17 is devoid of cobalt. Curve 27 of FIG. 2 shows that calcium is extracted from the aqueous phase in compartments below L11 and is back-extracted into the aqueous phase in compartments L1 to L10. The back-extraction of calcium ion into the aqueous phase causes supersation of calcium sulfate in the aqueous phase, saturation under the experimental conditions being indicated by the vertical dashed line 28. This superaturation in compartments L1 to L10 causes gypsum ($CaSO_4 2H_2O$) scaling in these compartments which in turn causes column 11 to be inoperative after a relatively short period of time.

THE INVENTION

The invention comprises operating a countercurrent solvent extraction process wherein, valuable metal, e.g., cobalt, present in a aqueous sulfate solution along with a substantially saturation amount of calcium, is extracted by contacting the aqueous sulfate solution in a countercurrent fashion in a plurality of stages with an organic extractant capable of extracting both the valuable metal and calcium but being substantially selective with respect to the valuable metal vis-a-vis calcium, such that contact of the extractant with the aqueous solution is minimized in the absence of the valuable metal in aqueous solution. In other words, in cases where the valuable metal is completely or substantially completely extracted, contact between the aqueous phase and the organic phase is to be avoided when the valuable metal no longer is present in the aqueous sulfate solution.

The present invention is particularly applicable to the extraction of cobalt from nickel-containing sulfate solutions also containing saturation amounts of calcium sulfate using, as an extractant, Cyanex TM 272 believed to comprise principally material of the formula

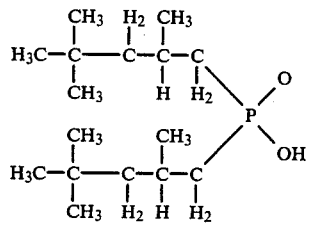

dissolved in a petroleum-based hydrocarbon solvent Varsol TM DX3641 described in the vendor's literature as a petroleum hydrocarbon, comprising about 6% aromatics about 53% naphthenes and about 41% parafins has been found to be a suitable solvent for Cyanex TM 272.

The process of the present invention can be carried out in any conventional equipment useful for at least plural stage countercurrent solvent extraction. Such equipment includes a battery of mixer settlers or, as preferred, a solvent extraction column having mixing means so arranged as to provide at least two theoretical stages of extraction sequence. One suitable form of solvent extraction column is depicted in FIG. 1 of the drawing although, as used commercially such a column would be devoid of sampling tubes SC1–SC16 and L1 to L17.

A much preferred manner of carrying out the process of the present invention in which a valuable metal is extracted from an aqueous sulfate phase in the presence of a saturation amount of calcium ion in solution in the aqueous sulfate phase comprises:

(a) contacting a stream of said aqueous phase countercurrently in a plurality of mixing stages with a stream of said organic phase whereby hydrogen ion from an organic constituent, interchanges with said metal in said aqueous phase to permit incorporation of said metal into said organic phase, (b) adjusting and maintaining the pH of said aqueous phase at or near the stage of initial mixture of the unloaded organic stream with the depleted aqueous stream at a first pH which permits extraction of said metal but minimizes extraction of calcium into said organic phase, and (c) adjusting an maintain the pH of said aqueous phase at a mixing stage downstream with respect to said organic phase at a pH different from said first pH to maximize extraction of said metal into said organic stream, whereby contact of organic phase with aqueous phase depleted of the metal is minimized and supersaturation of the aqueous phase with respect to calcium sulfate in any stage of the extraction process is avoided.

Figure 3:
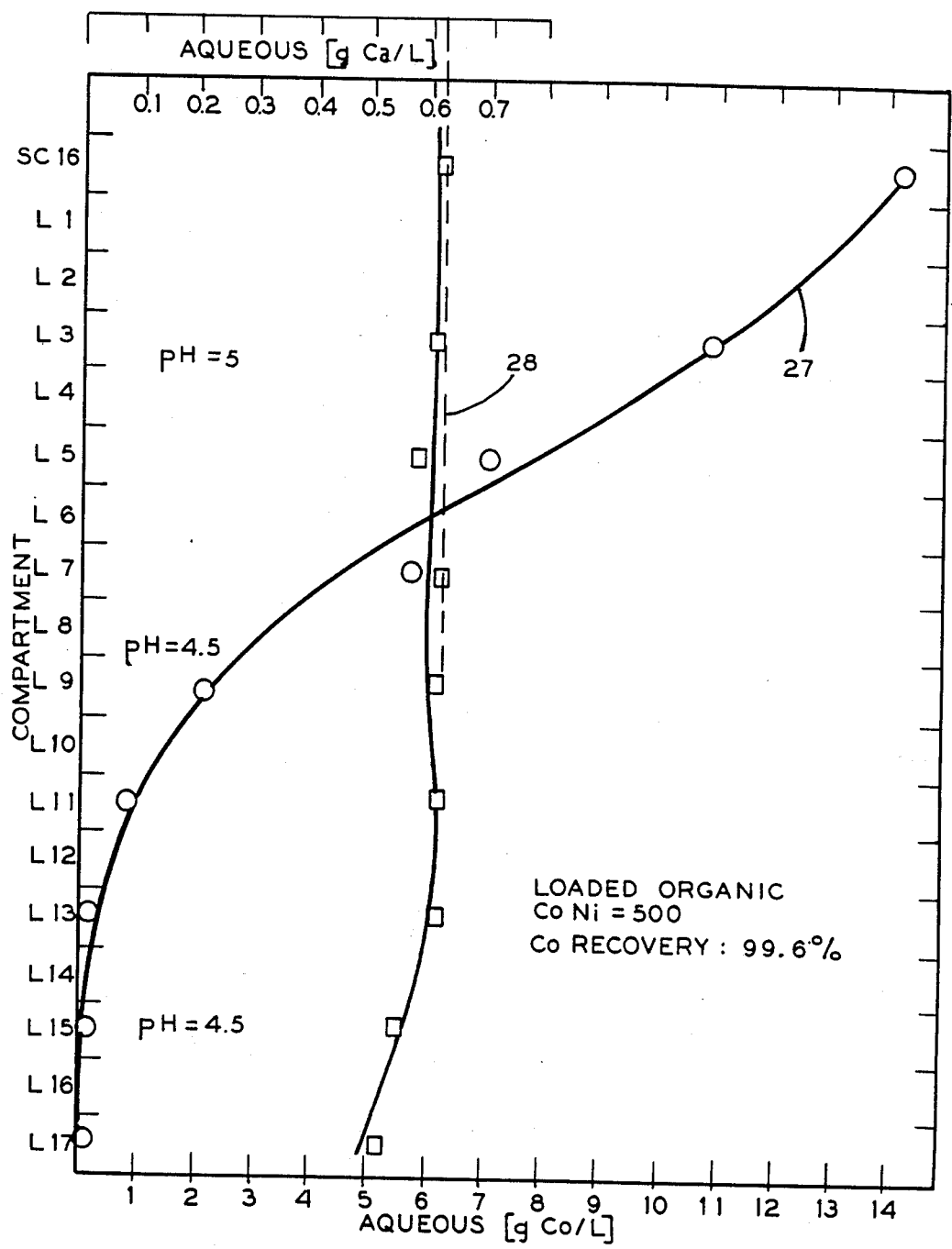
FIG. 3 is a graph similar to that of FIG. 2 showing concentration values when an extraction is run in the column at pHs of 4.5 and 5.0.

This preferred aspect of the process of the present invention is illustrated and exemplified in FIG. 3 of the drawing. FIG. 3 is similar to FIG. 2 in its setup showing the content of the aqueous phase in respect to cobalt and calcium in the various compartments of column 11 of FIG. 1. Essentially the same aqueous feed solution and organic extractant were employed in obtaining the data plotted on FIG. 3 as were employed in obtaining the data plotted on FIG. 2. The difference between the two figures is that in the process represented by FIG. 2 a constant pH of 5 was maintained along the length of column whereas in the process represented by FIG. 3 an initial pH of 4.5 was maintained at the column bottom and a pH of 5 was maintained at the top of the loading section. FIG. 3 shows that by so arranging the pH profile, organic extractant is present along with cobalt-free aqueous phase in only two compartments, that very little calcium is picked up by the organic phase and that at no place along the length of column 11 is the aqueous phase supersaturated with respect to calcium sulfate. The result of this situation is that gypsum scaling is avoided in column 11.

In the special case of cobalt extraction from nickel-containing aqueous sulfate solutions which also contain saturation amounts of calcium using Cyanex TM 227 as the extractant, it has been found that there are inverse linear relationships between the content in g/l of cobalt in the organic phase and the common log of the calcium distribution ration (total concentration calcium in the organic phase divided by the total concentration in the aqueous phase) at pH's of 4.5 and 5. At concentrations of cobalt in the organic phase of less than 1 g/l, the calcium distribution ratio at pH 4.5 is an order of magnitude less than the calcium distribution ratio of unity at a pH of 5. Thus even though a pH of 4.5 is less favorable than a pH of 5 for loading of cobalt in Cyanex TM 227, it is nevertheless very favorable for initial loading of cobalt in preference to calcium in Cyanex TM 227.

Those of normal skill in the art will appreciate that any solvent extraction reaction in which hydrogen or hydroxyl ion is either a product or a reactant can be controlled, at least to a limited extent, by pH control. Some such solvent extraction reactions include extractant reagent protonation, acid-base equilibria, chelating action of extractants and metal hydrolysis reactions. Any one of these and other mechanisms which can be controlled by pH control means to provide minimum contact of unloaded organic extractant with aqueous calcium-containing solution devoid of extractable metal is useful in the practice of the present invention.

While in accordance with provisions of the statue, there is illustrated and described herein specific embodiments of the invention. Those skilled in the art will understand that changes may be made in the form of the invention covered by the claims and the certain features of the invention may sometimes be used to advantage without a corresponding use of the other features.

I claim:

1. In a process of solvent extracting metal from an aqueous sulfate solution containing calcium in a substantially saturation amount wherein said aqueous solution is contacted in a countercurrent fashion in at least a duality of stages with an organic extractant capable of extracting both said metal and calcium but being substantially selective as to said metal vis-a-vis calcium, the improvement to minimize deposition of gypsum in any one of said stages comprising minimizing contact of said extractant with said aqueous solution when said metal is substantially completely extracted from said aqueous sulfate solution.

2. A process for selectively extracting a metal from an aqueous sulfate phase into an organic phase in the presence of a saturation amount of calcium ion in solution in said aqueous sulfate phase comprising:

(a) contacting a stream of said aqueous phase countercurrently in plurality of mixing stages with a stream of said organic phase whereby hydrogen ion from an organic constituent interchanges with said metal in said aqueous phase to permit incorporation of said metal into said organic phase,
(b) adjusting and maintaining the pH of said aqueous phase at or near the stage of initial mixture of the unloaded organic stream with the depleted aqueous stream at a first pH which permits extraction of said metal but minimizes extraction of calcium into said organic phase, and
(c) adjusting and maintaining the pH of said aqueous phase at a mixing stage downstream with respect to said organic phase at a pH different from said first pH to maximize extraction of said metal into said organic stream, whereby supersaturation of the aqueous phase with respect to calcium sulfate in any stage of the extraction process is avoided.

3. A process as in claim 2 wherein the metal being selectively extracted is cobalt.

4. A process as in claim 3 wherein cobalt is selectively extracted from a nickel-containing solution.

5. A process as in claim 2 wherein the organic constituent includes a phosphinic acid having one of the following formulas:

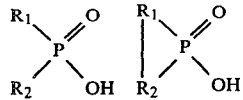

wherein $R_1$ and $R_2$ are, individually, substituted or unsubstituted alkyl, cycloalkyl, alkoxyalkyl, alkylocyclo alkyl, aryl, alkaryl aralkyl or cycloalkylaryl radicals.

6. A process as in claim 5 wherein the organic constituent comprises di(2,4,4-trimethylpentyl) phosphinic acid dissolved in a hydrocarbon solvent.

* * * * *